(12) United States Patent
Jetha et al.

(10) Patent No.: US 6,661,426 B1
(45) Date of Patent: Dec. 9, 2003

(54) USER INTERFACE GENERATION

(75) Inventors: Zeenat Jetha, Vancouver (CA); Johannes A. Jansen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 470 days.

(21) Appl. No.: 09/668,335

(22) Filed: Sep. 22, 2000

(30) Foreign Application Priority Data

Sep. 25, 1999 (GB) .............................................. 9922627
Dec. 30, 1999 (GB) .............................................. 9930786

(51) Int. Cl.$^7$ ................................................ G09G 5/00
(52) U.S. Cl. ...................................... 345/629; 345/768
(58) Field of Search ................................ 345/629, 630, 345/421, 640, 638, 639, 768, 848

(56) References Cited

U.S. PATENT DOCUMENTS

| | | | | |
|---|---|---|---|---|
| 5,590,265 A | | 12/1996 | Nakazawa | ................... 395/340 |
| 5,625,764 A | | 4/1997 | Tsujimoto et al. | .......... 395/135 |
| 5,680,152 A | | 10/1997 | Bricklin | ....................... 345/119 |
| 5,706,097 A | | 1/1998 | Schelling et al. | ........... 358/296 |
| 5,877,817 A | | 3/1999 | Moon | .......................... 348/564 |
| 5,896,131 A | * | 4/1999 | Alexander | ................... 345/340 |
| 5,933,141 A | * | 8/1999 | Smith | .......................... 345/339 |
| 6,002,403 A | * | 12/1999 | Sugiyama et al. | ........... 345/335 |
| 6,088,032 A | * | 7/2000 | Mackinlay | ................... 345/355 |
| 6,429,883 B1 | * | 8/2002 | Plow et al. | ................... 345/768 |

FOREIGN PATENT DOCUMENTS

| | | | | |
|---|---|---|---|---|
| EP | 0840276 A2 | 5/1998 | ............ G09G/5/14 |
| EP | 0840277 A2 | 5/1998 | ............ G09G/5/14 |
| EP | 0849946 A2 | 6/1998 | ............ H04N/7/08 |
| EP | 0901284 A2 | 3/1999 | ............ H04N/7/08 |
| WO | WO9613120 | 5/1996 | ............ H04N/5/45 |
| WO | WO9623193 | 8/1996 | ............ F42B/5/02 |
| WO | WO9728499 | 8/1997 | ............ G06F/9/00 |
| WO | WO9911060 | 3/1999 | .......... H04N/5/445 |

OTHER PUBLICATIONS

Japan 09 148996A, "Broadcasting System, Its Center Device and Broadcasting Reception Equipment" (Abstrac).

* cited by examiner

Primary Examiner—Matthew Luu
(74) Attorney, Agent, or Firm—Gregory L. Thorne

(57) ABSTRACT

An on-screen display generation apparatus (10) and method for controlling the same are provided, in which data from two or more independent sources (12, 16) is used by a windows controller (22) to generate and periodically update a respective display panel for each source based at least partially on data from that source. A display controller (28) is configured to generate output pixel values for display (32) based at least partially on contributions from two or more of the display panels (34, 36), with certain pixels having contributions from two display panels where a first panel is positioned to at least partially overlie a second and the overlying part of the first panel is specified as translucent.

14 Claims, 4 Drawing Sheets

USER INTERFACE GENERATION

BACKGROUND OF THE INVENTION

The present invention relates to apparatuses having display means operable to display data from two or more sources simultaneously, particularly but not exclusively in respective display panels or windows on a single screen or display device, and to methods for managing the presentation and updating of such data displays.

Such multiple source display apparatuses have become a relatively common feature in the past few years, with windows desktops on computers and picture-in-picture facilities on televisions being two well known examples. U.S. Pat. No. 5,680,152 (Bricklin) describes a method and apparatus for navigating multiple independent windowed images on a computer display screen of a computer display system. Whilst the windows may be of an arbitrary shape and size, Bricklin (in common with many other such systems) prefers that they be rectangular.

An On Screen Display (OSD) system for a digital television set-top box is described in European patent application EP-A-0 840 277 (Texas Instruments). The OSD system described can simultaneously display different kinds of pictures, such as a bit-map, a graphic, a still video picture, a motion video picture, or a background colour, with each in a respective window. A random access memory device provides both CPU working memory and a store for the assembled windows in the system of EP-A-0 840 277 with a window controller selectively reading contributions from a selected window to a first-in-first-out memory holding the bits required to display each pixel of the composed screen display.

As hinted at by EP-A-0 840 277, displays may be required to display data not only from several sources, but also from several kinds of source and, as will be appreciated, this can lead to crowding if each source is to inhabit a separate area of the display. Whilst the user operation of selecting a single display panel and zooming out such that it fills the majority (if not all) of the available display space can improve the clarity, it is becoming more common for users to require to have a number of panels or windows open to view at any given time.

SUMMARY OF THE INVENTION

It is accordingly an object of the present invention to provide a display system which gives improved volume of display capacity per unit area of display surface.

It is a further, subsidiary, object to provide such a system supporting improved indexing and access facilities for the user.

In accordance with a first aspect of the present invention there is provided an on screen display generation apparatus comprising: two or more independent sources of data for display; a windows controller arranged to generate and periodically update a respective display panel for each source based at least partially on data from that source; first storage means holding data for generated display panels including specification that at least a part of one panel is translucent; and a display controller configured to generate output pixel values for display based at least partially on contributions from two or more of said display panels, with certain pixels having contributions from two display panels where a first panel is positioned to at least partially overlie a second and the overlying part of the first panel is specified as translucent.

By providing for the overlying portion of a display panel to be translucent, the features of the overlain panel can at least partially be seen, thereby making available to the user a greater volume of data.

The windows controller may be arranged to generate each display panel as a first portion and a second, attached, portion with only one of the first and second portions being specified as translucent. In such an arrangement, one of the sources may suitably comprise a source of video image frame sequences and the display panel for that source may then display the video image frames in the portion other than that specified as translucent. Also, such video image source may supply ancillary data to the video image frame sequences and the windows controller may then be arranged to generate content in the portion specified as translucent on the basis of said ancillary data.

One of the sources may comprise a tuner capable of receiving broadcast television signals, and another may be is a web browser configured to obtain from the Internet web pages relevant to a currently displayed broadcast television signal and to present any web pages so found in an at least partially translucent panel overlying that panel on which images from the broadcast television signal are being shown.

The display controller may be arranged to generate a two dimensional image of a three dimensional environment, based on stored data defining said environment, from a predetermined viewpoint within said environment, and with said display panels mapped onto surfaces within said environment. With such an arrangement, user-operable input means are preferably provided by operation of which the user is enabled to manoeuvre the location and/or direction of said viewpoint within the three dimensional environment.

In one embodiment, to be described in greater detail hereinafter, the above-mentioned stored data defining the environment may define a plurality of generally prismatic bodies each having at least a planar face onto which a respective display panel is mapped and an adjacent surface onto which said overlying part is mapped. Such prismatic bodies, which may for example be parallelepidel blocks or objects, may have two or more surfaces adjacent said planar face with each of said surfaces carrying ancillary data to the contents of the display panel, for which arrangement the user operable input means is preferably operable to direct said viewpoint to a user-selected one of said surfaces carrying ancillary data. To further facilitate the indexing of the data panels by the user, the ancillary data on respective surfaces of a prismatic body may be divided into a predetermined number of data categories, with the respective prismatic bodies being arranged such that at least some of the prismatic body respective faces having a given category of ancillary data may be viewed simultaneously from a single viewpoint. In other words, the selection of a particular viewpoint may bring into view the "top" edges of all the blocks on which the authors of the respective works appearing on the display panels are identified, whilst a second viewpoint might show all the left-side edges of the blocks on which the titles of the respective works are identified.

As a further user-settable feature, and by operation of the same or another user operable input means, the user may be enabled to vary the extent of translucency for an overlying portion.

Also in accordance with the present invention there is provided a method for control of on-screen display of data from two or more independent sources of data for display, comprising:

generating and periodically updating a respective display panel for each source based at least partially on data from that source;

storing the generated display panels together with specification that at least a part of one panel is translucent; and generating output pixel values for display based at least partially on contributions from two or more of said display panels, with certain pixels having contributions from two display panels where a first panel is positioned to at least partially overlie a second and the overlying part of the first panel is specified as translucent.

BRIEF DESCRIPTION OF THE DRAWINGS

Further features and advantages of the present invention will become apparent from reading of the following description of preferred embodiments of the present invention, given by way of example only, and with reference to the accompanying drawings, in which.

DETAILED DESCRIPTION OF THE PREFERRED EMBODIMENTS

Figure 1:
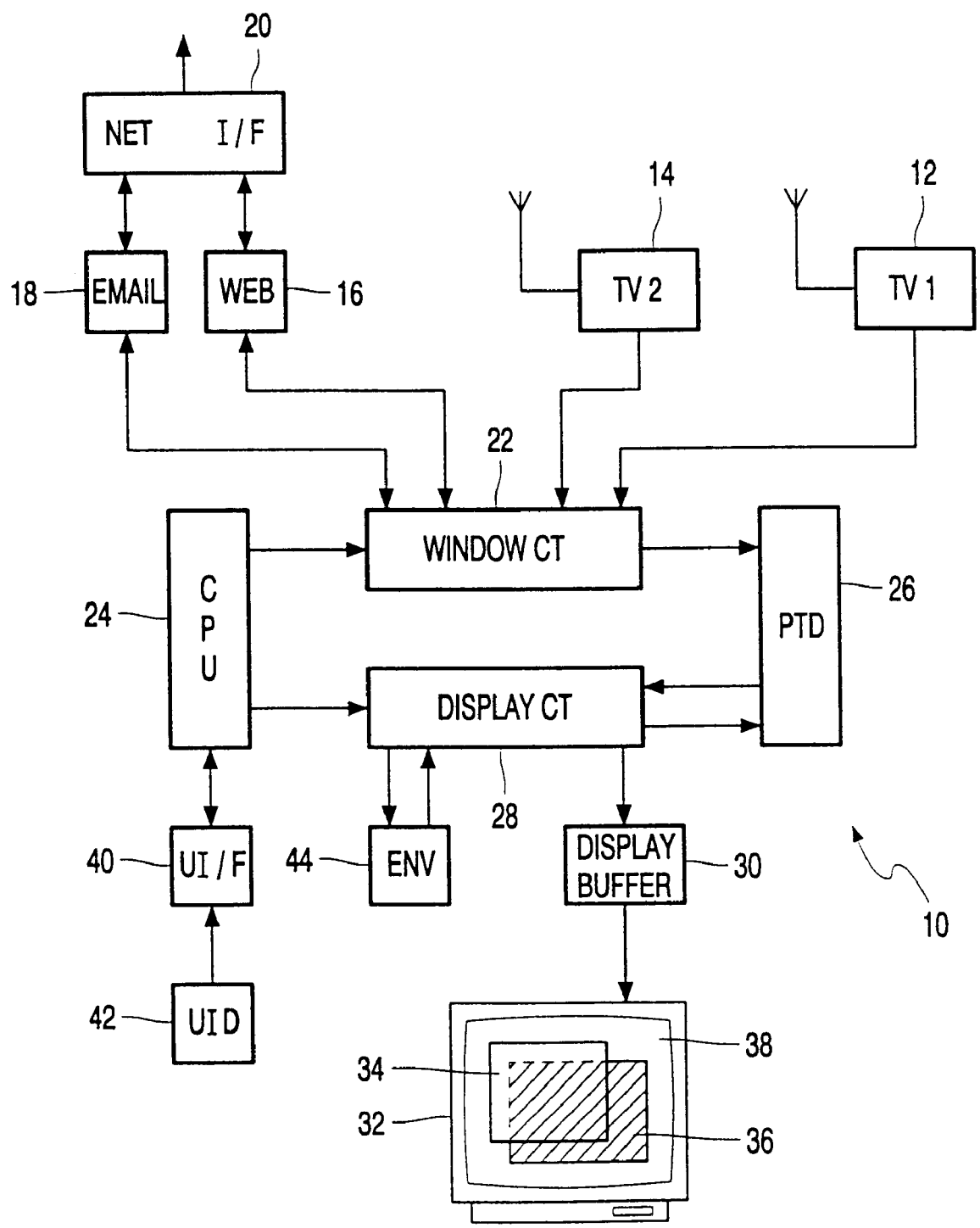
FIG. 1 is a block schematic diagram of apparatus embodying the present invention.

Beginning with FIG. 1, an on-screen display generation apparatus embodying the invention is illustrated generally at 10. Coupled to the apparatus are a number of independent sources of data for display: in the example shown, the sources comprise first 12 and second 14 television tuners, a web browser 16 and an electronic mail facility 18. The web browser 16 and e-mail facility 18 are coupled to access data over the Internet by a suitable interface 20.

In the following, we are concerned principally with the handling of the image (and ancillary data) content received by the television tuners: the handling of audio signals is not an element of the present invention and has been omitted from the following examples for the sake of clarity.

The apparatus 10 comprises a windows controller 22 coupled to receive data from the sources 12, 14, 16, 18 and, under the direction of a central processing unit (CPU) 24 co-ordinating operations of the apparatus, the controller 22 is arranged to generate and periodically update a respective display panel for each source based at least partially on data from that source: options for the particular form and format of display will be discussed hereinafter.

Coupled with the windows controller 22 is a first storage means in the form of panel and translucency data (PTD) store 26 holding data for display panels generated by the controller 22 and including specification that at least a part of one or more of the panels is translucent. Where a predetermined level of translucency is specified for all overlapping panels or panel segments in the system, the specification of translucency held in store 26 may be as little as a single flag per display panel indicating whether or not, when that particular panel overlays another panel, it is to be rendered opaque or translucent. As will be described hereinafter, a more detailed specification for a panel may be supported with store 26 holding specification of differing translucency levels for individual areas of a display panel, down to a resolution of a single pixel.

Also coupled to the system CPU 24, and arranged to read the data panel colour and translucency data from store 26, a display controller 28 is configured to generate output pixel values for supply via a display buffer 30 to television or display screen 32: in the Figure, a display featuring two such display panels 34, 36 is shown. The display controller 28 generates the pixel values based at least partially on contributions from two or more of said display panels. Other contributions may come from a background or wallpaper 38 which the display panels overlie.

A further feature of the apparatus, coupled to the system CPU 24 via a suitable interface 40, is one or more user input devices 42 by means of which the user is enabled to interact with the displayed data on screen 32. The particular form of the or each interface device 42 will be dependent on the level of interaction supported. For example, where the apparatus 10 is housed in a set-top box supplying images to a television 32, the input device may be in the form of a hand-held remote control device for the television, controlling the television through commands sent over an infra-red link in known fashion. Where the apparatus 10 is housed in a home computer, the UID 42 may comprise a computer keyboard together with a pointer device for inputting movement commands in two or three dimensions.

Figure 2:
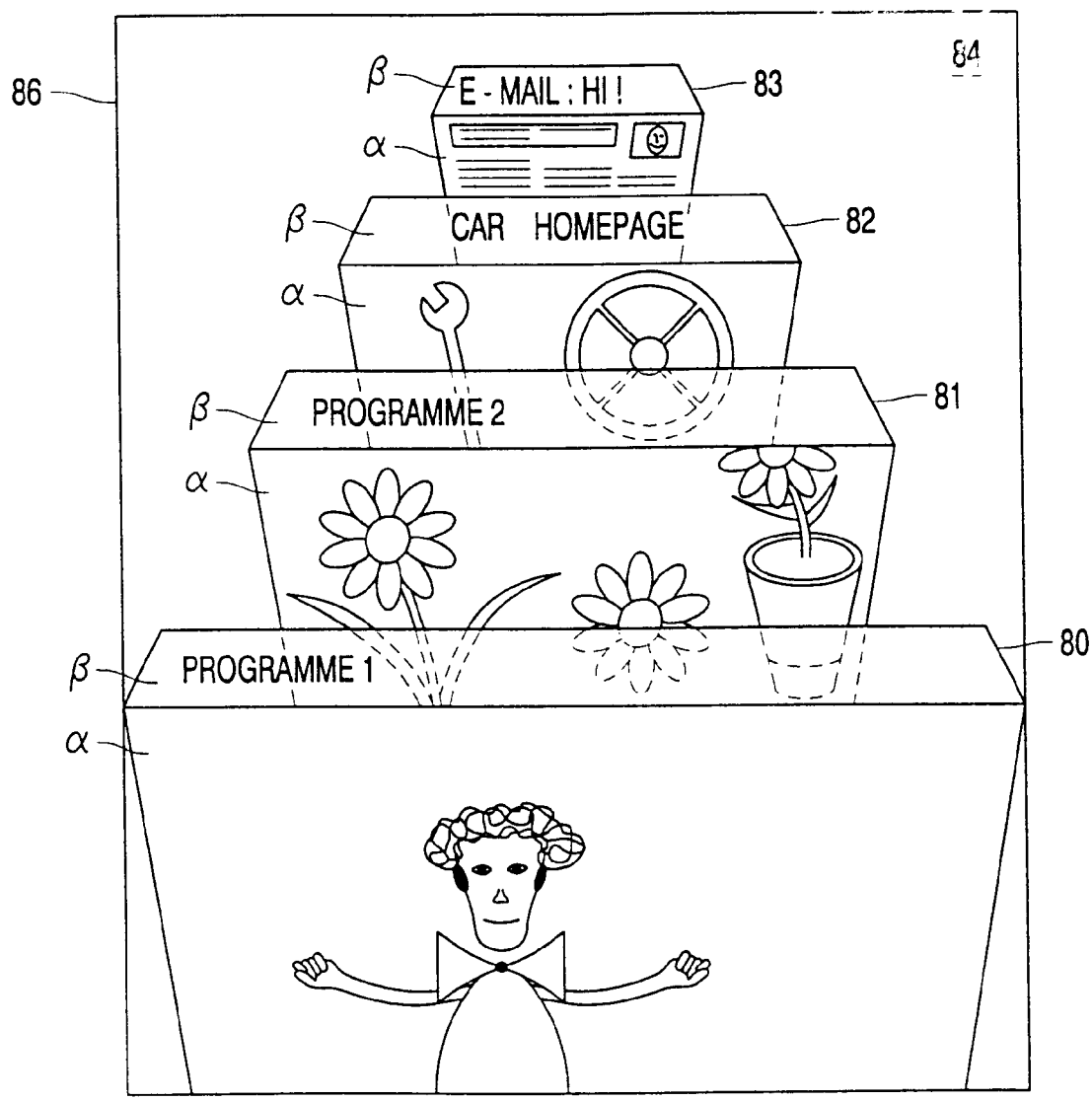
FIG. 2 shows a first arrangement of display panels in an on-screen display.

Turning now to FIG. 2, a first potential arrangement of display panels to form a user interface is illustrated. The arrangement comprises four panels 80–83 arranged to simulate receding panels in parallel alignment, with one behind the other in a three-dimensional interface space 84. Note that the border 86 is not constrained to have the proportions shown, and may instead have an aspect ratio of 4:3 or 16:9 as determined by the display device.

In order to generate the arrangement of FIG. 2, the display controller 28 of FIG. 1 is preferably arranged to generate a two dimensional image of the three dimensional interface space or environment 84, based on stored data defining the environment held in a further memory device 44 or further area of system memory coupled with the display controller. In conventional manner for the handling of three dimensional imaging for virtual reality and associated applications, the image is generated from a predetermined viewpoint having a given location and orientation within the environment. The display panels, whether carrying graphic image data, live television images (as for panels 80 and 81), Internet web pages (as for panel 82) or e-mail messages (panel 83) are mapped onto surfaces within said environment.

In the example of FIG. 2, the windows controller (22; FIG. 1) has generated each display panel as a first portion and a second, attached, portion with only one of the first and second portions being specified as translucent. As shown, each display panel 80–83 comprises a first portion a on which the displayed content appears and a second portion β attached to the first and carrying ancillary data to identify the contents of each panel to the user. As shown, the first portions a of the respective display panels are opaque, whereas the second portions β are translucent, revealing at least partially the contents of the overlaid first portion a from the display panel behind.

With the arrangement of display panels as shown in FIG. 2, scrolling through the different sources is suitably achieved by moving the viewpoint within the environment 84 such that the user appears to "fly over" the panels, with the content portions α of three or four of the panels visible simultaneously and the title bar or ancillary data portions β being translucent to reduce the extent to which they obscure the content of the window behind.

Figure 3:
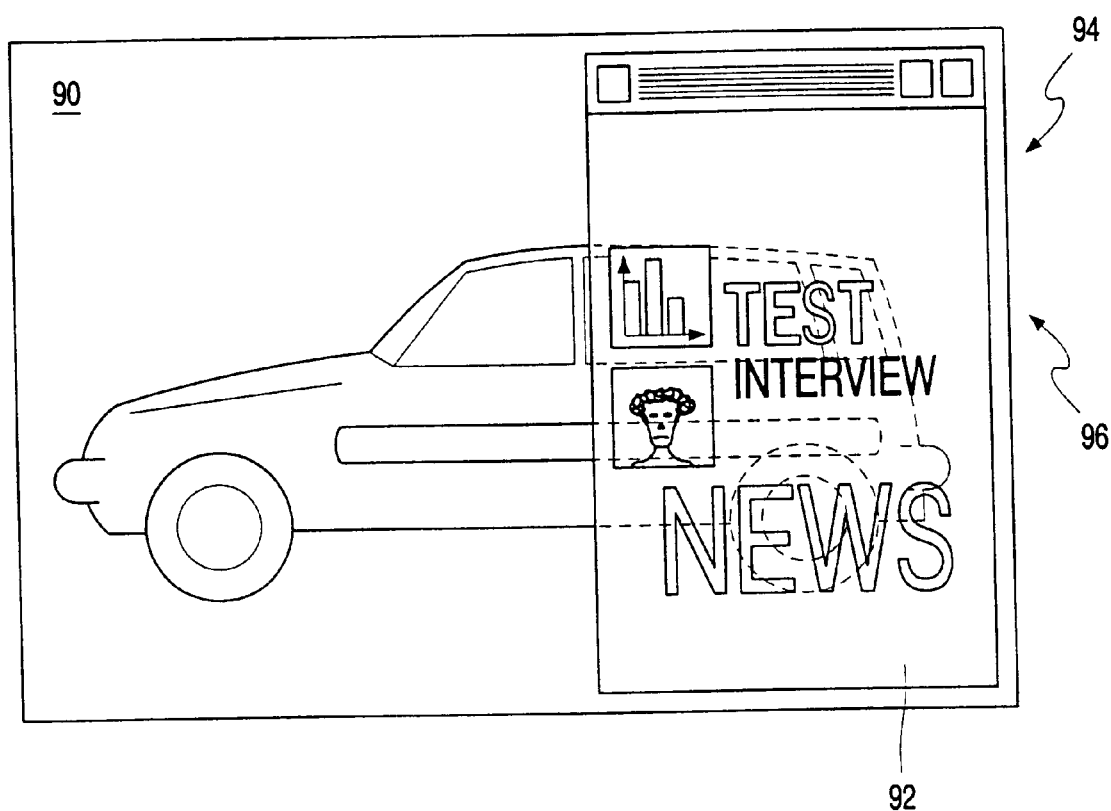
FIG. 3 shows a second arrangement of display panels in an on-screen display.

Turning now to FIG. 3, an alternative arrangement of display panels is shown, with a first (full screen) panel 90 being overlaid by a smaller, partially translucent, windowed displayed panel 92. In terms of content, the full screen panel may be carrying a television broadcast, with the overlaid window comprising a web page. The web page may be specifically associated with the television broadcast displayed (indeed the broadcast data may identify the page specifically and in a way detectable by the web browser accessing the page) or it may be more generically linked, with the web browser having means for identifying (at least to a broad level of classification) the subject matter of the broadcast and then acting as a search engine to find and call up a page of potentially interesting ancillary data for the user.

The example of FIG. 3 shows how discrete areas of the overlaid display panel may be individually specified in terms of transparency, with the picture and text indicated generally at 94 being opaque (i.e. fully obscuring the television picture beneath) whilst the picture and text indicated generally at 96 is translucent and is not so intrusive to the viewer. In order the further clear the broadcast image for the viewer (for example whilst the web browser is searching for new pages), the windowed display panel 92 may be minimised to an icon at the bottom of the screen in known manner.

Figure 4:
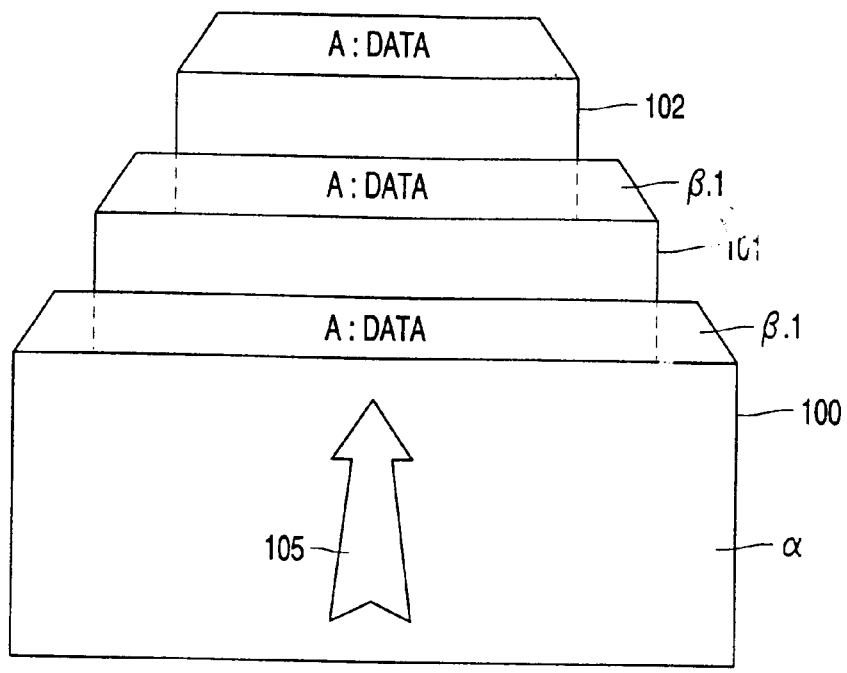
FIGS. 4 and 5 illustrate navigation of an indexing interface provided by a modified version of the first arrangement of FIG. 2.
Figure 5:
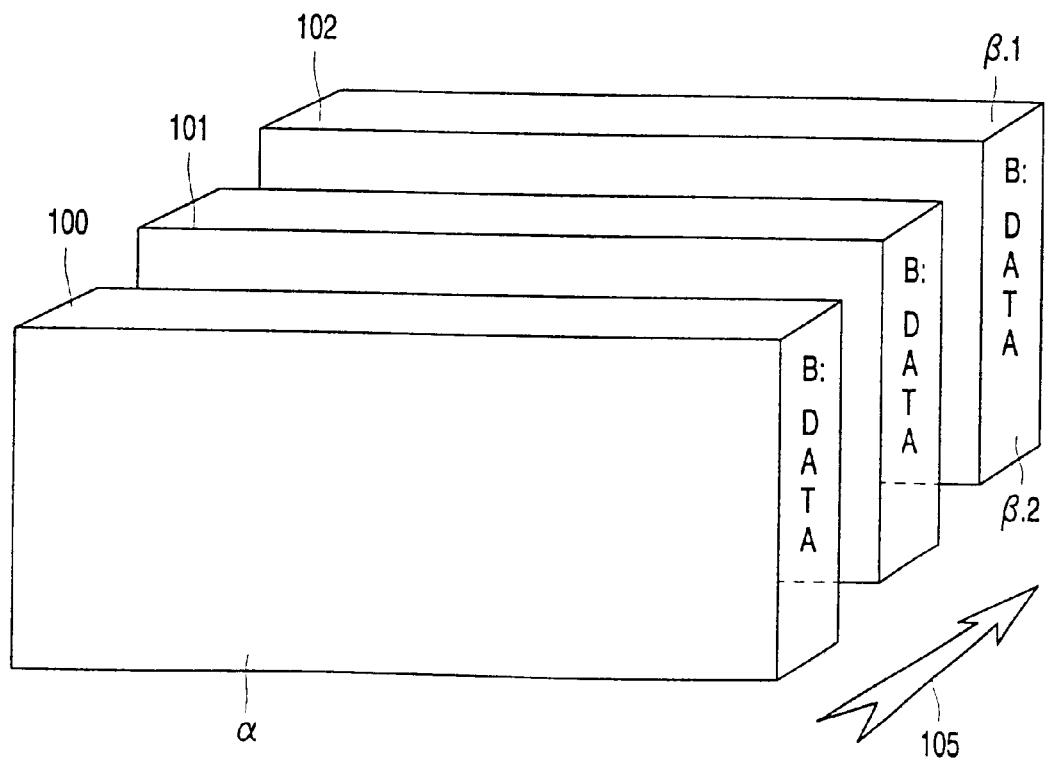

FIGS. 4 and 5 illustrate a variant on the arrangement of FIG. 2 which makes particular use of the display controller arrangement for generating a two dimensional image of a three dimensional environment, based on stored data defining the environment, from a user-movable viewpoint within said environment, and with said display panels mapped onto surfaces within said environment.

As before, the stored data defining the environment defines a plurality of generally prismatic bodies 100, 101, 102 each having at least a planar face α onto which a respective display panel is mapped (the mapped data being omitted for the sake of clarity from FIGS. 4 and 5) and an adjacent surface β onto which said overlying part is mapped. The particular feature of this embodiment is that each prismatic body has two or more adjacent surfaces β.1, β.2 from the planar face with each of these adjacent surfaces β carrying ancillary data to the contents of the display panel. By operation of the user input device (UID 42; FIG. 1), the user is enabled to direct the viewpoint (as indicated by arrow 105) toward a user-selected one of the surfaces β.1, β.2 carrying ancillary data.

The ancillary data on the respective surfaces β.1 and β.2 of the prismatic body is divided into a predetermined number of data categories (A: Data; B: Data), with the respective prismatic bodies being arranged such that at least some of the prismatic body respective faces having a given category of ancillary data may be viewed simultaneously from a single viewpoint, i.e. such that all the "A: Data" faces line up (as in FIG. 4) or all the "B: Data" faces line up (as in FIG. 5).

These different data categories enable a user to search or index through the panels by different categories of data. For example, where the main display panel α carries e-mail messages, the side panels (and even the back of the parallelepidel block) may be respectively assigned to carry data identifying the author, subject matter, time and/or date received and so forth.

As for the FIG. 2 embodiment, the prismatic or parallelepidel block onto which the display panel and ancillary panels are mapped is assumed to be transparent (it is effectively just a set of coordinates within the 3D environment defining the box or panel outline) and each of the ancillary panels β is also rendered at least partially transparent to enable some content from the display panel of the block behind to be seen—this is particularly useful where data on the rear surface of a block is being read, which data would otherwise largely obscure the display surface of the following block.

From reading the present disclosure, other variations will be apparent to persons skilled in the art. Such variations may involve other features which are already known in the field of apparatuses having graphical or screen display interfaces or component parts thereof and/or methods for control of the same and which may be used instead of or in addition to features already described herein.

What is claimed is:

1. On screen display generation apparatus comprising:
    two or more independent sources of data for display;
    a windows controller arranged to generate and periodically update a respective display panel for each source based at least partially on data from that source;
    first storage means holding data for generated display panels including specification that :at least a part of one panel is translucent; and
    display controller configured to generate output pixel values for display based at least partially on contributions from two or more of said display panels, with certain pixels having contributions from two display panels where a first panel is positioned to at least partially overlie a second and the overlying part of the first panel is specified as translucent, wherein the windows controller is arranged to generate each display panel as a first portion and a second, attached, portion with only one of the first and second portions being specified as translucent and wherein one of said sources comprises a source of video image frame sequences and the display panel for that source displays the video image frames in the portion other than that specified as translucent.

2. Apparatus as claimed in claim 1, wherein said one of said sources supplies ancillary data to said video image frame sequences and the windows controller is arranged to generate content in the portion specified as translucent on the basis of said ancillary data.

3. Apparatus as claimed in claim 1, wherein one of said sources comprises a tuner capable of receiving broadcast television signals.

4. Apparatus as claimed in claim 3, wherein another of said sources is a web browser configured to obtain from the Internet web pages related to a currently displayed broadcast television signal and to present any web pages so found in an at least partially translucent panel overlying that panel on which images from the broadcast television signal are being shown.

5. Apparatus as claimed in claim 3, wherein said display controller is arranged to generate a two dimensional image of a three dimensional environment, based on stored data defining said environment, from a predetermined viewpoint within said environment, and with said display panels mapped onto surfaces within said environment.

6. Apparatus as claimed in claim 5, further comprising user-operable input means by operation of which the user is enabled to maneuver the location and/or direction of said viewpoint within the three dimensional environment.

7. Apparatus as claimed in claim 6, wherein the stored data defining the environment defines a plurality of generally prismatic bodies each having at least a planar face onto which a respective display panel is mapped and an adjacent surface onto which said overlying part is mapped.

8. Apparatus as claimed in claim 7, wherein each prismatic body has two or more surfaces adjacent said planar face with each of said surfaces carrying ancillary data to the contents of the display panel, and the user operable input means is operable to direct said viewpoint to a user-selected one of said surfaces carrying ancillary data.

9. Apparatus as claimed in claim 8, wherein the ancillary data on respective surfaces of a prismatic body is divided into a predetermined number of data categories, with the respective prismatic bodies being arranged such that at least some of the prismatic body respective faces having a given category of ancillary data may be viewed simultaneously from a single viewpoint.

10. Apparatus as claimed in claim 1, further comprising user operable input means by operation of which a user is enabled to vary the extent of translucency for an overlying portion.

11. A method for control of on-screen display of data from two or more independent sources of data for display, comprising:

generating and periodically updating a respective display panel for each source based at least partially on data from that source;

storing the generated display panels together with specification that at least a part of one panel is translucent; and generating output pixel values for display based at least partially on contributions from two or more of said display panels, with certain pixels having contributions from two display panels where a first panel is positioned to at least partially overlie a second and the overlying part of the first panel is specified as translucent, wherein one of said sources comprises a source of video image frame sequences and the display panel for that source displays the video image frames in the portion other than that specified as translucent.

12. On screen display generation apparatus comprising:

two or more independent sources of data for display;

a windows controller arranged to generate and periodically update a respective display panel for each source based at least partially on data from that source;

first storage means holding data for generated display panels including specification that at least a part of one panel is translucent;

a display controller configured to generate output pixel values for display based at least partially on contributions from two or more of said display panels, with certain pixels having contributions from two display panels where a first panel is positioned to at least partially overlie a second and the overlying part of the first panel is specified as translucent, wherein said display controller is arranged to generate a two dimensional image of a three dimensional environment, based on stored data defining said environment, from a predetermined viewpoint within said environment, and with said display panels mapped onto surfaces within said environment; and user-operable input means by operation of which the user is enabled to maneuver the location and/or direction of said viewpoint within the three dimensional environment, wherein the stored data defining the environment defines a plurality of generally prismatic bodies each having at least a planar face onto which a respective display panel is mapped and an adjacent surface onto which said overlying part is mapped, and wherein each prismatic body has two or more surfaces adjacent said planar face with each of said surfaces carrying ancillary data to the contents of the display panel, and the user operable input means is operable to direct said viewpoint to a user-selected one of said surfaces carrying ancillary data.

13. Apparatus as claimed in claim 12, wherein the ancillary data on respective surfaces of a prismatic body is divided into a predetermined number of data categories, with the respective prismatic bodies being arranged such that at least some of the prismatic body respective faces having a given category of ancillary data may be viewed simultaneously from a single viewpoint.

14. Apparatus as claimed in claim 12, further comprising user operable input means by operation of which a user is enabled to vary the extent of translucency for an overlying portion.

* * * * *